3,828,084
PHOSPHOSULFURIZED SURFACE ACTIVE MATERIALS AND METHOD OF PRODUCING SAME

Harry Kaplan, Westfield, and John Papalos, Kearney, N.J., assignors to GAF Corporation, New York, N.Y.
No Drawing. Filed Dec. 29, 1971, Ser. No. 213,815
Int. Cl. C07f 9/08; C08h 9/00
U.S. Cl. 260—399      9 Claims

ABSTRACT OF THE DISCLOSURE

A phosphosulfurized composition comprising the product of the reaction of a compound containing the equivalent of about .25 to about 4.0 moles $P_2S_5$ with about 1 to about 5 moles of a nonionic surface active agent in the presence of 0 to 5% by weight of water and about .01 to about 5.0 of a phosphorous containing acid and a method of making same.

BACKGROUND OF THE INVENTION

The present invention relates to an improved catalytic method for producing phosphosulfurized surface active materials and products thereof. The invention has particular application to a process for introducing relatively high quantities of phosphorus and sulfur into organic materials which are obtained by condensing alcohols, amines and the like with $C_2$ to $C_4$ alkylene oxides, such as ethylene oxide, propylene oxide, etc.

It is known that it is desirable, for many purposes to be able to introduce sulfur and phosphorus into surface active materials. This is particularly true of nonionic organic surfactants which are first derived by the treatment of organic alcohols, amines, imines and the like, with alkylene oxide such as ethylene oxide, propylene oxide and butylene oxide. The phosphorus and sulfur may be introduced by treatment with a phosphorus sulfide, which results in the incorporation of certain amounts of phosphorus and sulfur into the finished compositions but has heretofore adversely affected their surface active properties color and storage life. This treatment gives the organic-alkylene oxide products certain properties which if properly attained could be very desirable for use as detergents, emulsifiers, additives for lubricating oils, and many other uses.

It is known that by treatment of such organic materials as those mentioned above with suitable phosphorus sulfides, particularly $P_2S_5$, surface active products can be produced having a wide range of utility, it has, however, not been particularly successful. The resulting products may be called thiophosphates, i.e., either mono- or di-thiophosphoric acid esters in which the acid is partly but not entirely esterified. The organic material may be any of a variety of non-ionic surface active condensation products of from 1 to 150 moles of a $C_2$ to $C_4$ alkylene oxide with a suitable organic compound having about 5 to about 40 or more carbon atoms. The organic compounds which are useful for this purpose should have at least one reactive hydrogen atom, such compounds comprise especially alcoholic or phenolic materials, i.e., those having hydroxyl or thio group, or compounds having carboxyl groups or primary or secondary amino groups or an imino group, particularly those amines or imines having a single hydrogen atom attached to the nitrogen. Compounds having heterocyclic rings or carboxy or amide groups, or sulfonamide groups having at least one hydrogen atom attached to the amide nitrogen may also be employed.

Preparation of anionic surface active ester compositions involving addition of $P_2S_5$ to the non-ionic surface active condensation products has in the past been accomplished by introducing only a relatively small quantity of suitable phosphorus sulfide, such as $P_2S_5$, into the non-ionic material, which had to be in liquid form, and in the absence of water, preferably under anhydrous conditions. If the non-ionic organic material is normally liquid, the $P_2S_5$ or other phosphorus sulfide can be introduced without changing the nature of the organic material. On the other hand, if the organic material is normally solid it should be heated sufficiently to melt it before treatment. Treatment is advantageously carried out at moderately elevated temperatures but below about 200° C., i.e., between ambient and about 160° C. The mixture should be agitated, preferably, vigorously during the addition of the phosphorus sulfide and preferably should be continued even after addition of the $P_2S_5$ is terminated. The reaction is largely completed when the phosphorus sulfide has been added; however, the continued agitation for a longer period, at or near the reaction temperature for about a fraction of an hour up to several hours, insures full completion of the reaction. Thereafter the mixture may be allowed to cool and is discharged.

As is known in the prior art, difficulty often is encountered in adding substantial quantities of phosphorus sulfide, e.g., $P_2S_5$. Apparently, as suggested above, the addition of the inorganic material results in formation of some esters of both mono- and di-thiophosphoric acids, but esterification is highly incomplete. Attempts to introduce larger quantities of $P_2S_5$ to obtain further reaction have generally resulted in excessive sludging and other difficulties.

SUMMARY OF THE INVENTION

It is an object of the present invention to avoid one or more drawbacks of the prior art.

It is another object of the present invention to provide for an improved phosphosulfurized composition of non-ionic surface active agents which have a substantially lighter color than heretofore produced.

It is still a further object of the invention to provide for an improved process of making phosphosulfurized compositions.

It is still a further object of the instant invention to provide a product which has increased storage life.

Other objects and advantages will be apparent as the description proceeds.

In general, the non-ionic surface active agents having the molecular configuration of a condensation product of at least one mole of an alkylene oxide, preferably ethylene oxide, with one mole of a compound containing at least 5 carbon atoms and a reactive hydrogen atom are preferably polyoxyalkylene derivatives of alkylated and polyalkylated phenols, multi-branched chain primary aliphatic alcohols having the molecular configuration of an alcohol produced by the Oxo process from a polyolefin of at least 7 carbon atoms, and straight chain aliphatic alcohols of at least 10 carbon atoms. Examples of these derivatives and other suitable non-ionic surface active agents which may be phosphated in accordance with the present invention are included below. In this list, "E.O." means "ethylene oxide" and the number preceding same refers to the number of moles thereof reacted with one mole of the given reactive hydrogen-containing compound.

Amyl alcohol+6 E.O.
Nonylphenol+9-11 E.O.
Nonylphenol+2 E.O.
Dinonylphenol+7 E.O.
Dodecylphenol+18 E.O.
Castor oil+20 E.O.
Tall oil+18 E.O.
Oleyl alcohol+20 E.O.
Lauryl alcohol+15 E.O.
Hexadecyl alcohol+12 E.O.
Hexadecyl alcohol+20 E.O.
Octadecyl alcohol+20 E.O.

Oxo tridecyl alcohol:
   (From tetrapropylene)+7 E.O.
   (From tetrapropylene)+10 E.O.
   (From tetrapropylene)+15 E.O.
Dodecyl mercaptan+9 E.O.
Soya bean oil amine+10 E.O.
Rosin amine+32 E.O.
Coconut fatty acid amine+7 E.O.
Cocoa fatty acid+10 E.O.
Dodecylbenzene sulfonamide+10 E.O.
Decyl sulfonamide+6 E.O.
Oleic acid+5 E.O.
Polypropylene glycol (30 oxypropylene units)+10 E.O., and, for example, those disclosed in U.S. Pats. 1,970,578, 2,205,021, 2,085,706, 2,002,613, 2,266,141, 2,677,700, 2,213,477, 2,593,112, 2,454,434, 2,908,543–5, and 2,174,761.

DETAILED DESCRIPTION

According to the present invention it has been found that by using particular catalysts, larger quantities of $P_2S_5$ (or other phosphorus sulfides, $P_2S_5$ being usually preferred, exemplary other phosphorous-sulfide sulfur-containing acid di-esters of pentavalent phosphorous, $P_4S_3$, $P_4S_5$, $P_4S_7$, $P_4S_{10}$ and the like) may be introduced into non-ionic surfactants of the type mentioned above with result of incorporating more phosphorous and more sulfur and without excessive sludging; the sludge presenting the problem of filtering and draining. According to the present invention, a small but catalytic amount of a certain type of phosphorus-containing compound is employed for this purpose. This catalyst is selected from the group consisting of hypophosphorous acid, or phosphorous acid, or a salt or an ester of one of these acids. Alternatively, mixtures of these acids or of their salts or their esters may also be used. In fact, any two or more of them may be employed.

Hypophosphorous acid and its alkali metal salts, e.g., sodium and potassium salts are generally preferred although any metal, alkaline earth metal, ammonium or amine salt of hypophosphorous acid or phosphorous acid may be employed, in addition to phosphorous acid per se. When hypophosphorous acid is employed, it is preferred to use a 30 to 50% aqueous solution thereof although aqueous solutions of this acid and other of the water soluble hypophosphorous and phosphorous acid compounds may be employed in the form of aqueous solutions ranging in concentration from less than 5 up to 70% or more.

The salts of hypophosphorous acid and phosphorous acid employed herein may be in their hydrated or dehydrated form. As examples of such salts, there may be mentioned aluminum, cadmium, sodium, potassium, lithium, calcium, strontium, barium, magnesium, ammonium, mono-, di-, and tri-methylamine, -ethylamine, -propylamine, -ethanolamine, and -propanolamine, pyridinyl, and morpholinyl phosphites and hypophosphites.

Esters of phosphorous acid may also be employed. These esters may be described as mono-, di-, and tri-alkyl, -aryl, and -cycloalkyl phosphites. It will be understood that mixed esters are included. As some specific examples of such esters in which the esterifying group generally contains from about 1 to 20 carbon atoms, there may be mentioned ethyl phosphite, lauryl phosphite, Oxo tridecyl phosphite (the esterifying alcohol having the molecular configuration of an alcohol produced from tetrapropylene or triisobutylene by the Oxo process), stearyl phosphite, phenyl phosphite, cyclohexyl phosphite, the corresponding di- and tri-substituted phosphites, ethyl phenyl phosphite, ethyl diphenyl phosphite, lauryl cyclohexyl phosphite, dipropyl phenyl phosphite, and the like.

The proportions of the catalytic material employed may range from about 0.01% to about 5% by weight, based on the weight of the non-ionic compound. The procedure may be carried out in the absence of water, that is, under anhydrous conditions or with small quantities of water present.

By the practice of this invention phosphosulfurized compounds are produced which are comparatively light in color or even substantially colorless. This is in marked contrast to similar materials produced by prior art methods. Furthermore, the resulting products have substantially better resistance to discoloration or darkening upon extended storage than those produced by the prior art methods.

Products of this general nature which are phosphosulfurized according to the present invention are principally those obtained from the alkoxylates of various aromatic, aliphatic and aliphatic-aromatic compounds, i.e. materials containing an active hydrogen atom which lends itself to such treatment. However, bases which are normally alkoxylated as suggested above also may be directly phosphosulfurized before alkoxylation. As noted above, phosphosulfurized products of this type obtained in the past have often been dark in color and this is especially true when it has been necessary to carry the reaction to substantial completion, for example, by maintaining the reaction mixture at elevated temperatures for extended periods of time. Furthermore, in the past, even products which initially were of light color have often become substantially darker on standing for extended periods of time, for example, for 3 to 6 months. It is highly desirable to prevent such darkening and this is accomplished to a substantial degree by the present invention. For many purposes, those who formulate various commercial products and compositions into which the phosphosulfurized compounds are to be incorporated as ingredients, will require products which are either totally uncolored or of very light color. Hence, it is to be expected that normally rigid color specifications may be imposed on such materials.

Broadly speaking, the instant invention includes the provision of a phosphosulfurized composition comprising the product of the reaction of (a) a compound containing the equivalent of about 0.25 to about 4.0 moles of $P_2S_5$ with (b) about 1 to about 5 moles of an anionic surface active agent having the molecular configuration of a condensation product of at least 1 mole of an alkalene oxide with 1 mole of a compound containing about 5 to about 40 carbon atoms and a reactive hydrogen atom from the group consisting of alcohols, phenols, thiols, alkyl phenols, fatty acids, amides and imides, and sulfonic acids, amides and imides, said reaction being conducted in the presence of 0 to about 5% water and a catalytic amount of a second and different phosphorous containing compound selected from the group consisting of phosphorous acid, hypophosphorous acid and neutral esters and salts thereof.

By use of catalytic amounts of phosphorous compounds as mentioned above in the phosphosulfurization reaction, it has been found that there is an unexpected and substantial improvement in the color of the products as well as a surprisingly high resistance of such products to discoloring when stored over extended periods of time as the incorporation of substantial quantities of phosphorous and sulfur therein. Products produced in accordance with the present invention generally have Varnish Color Scale values (VCS) of at least one less than do products of the same process carried out in the absence of the hypophosphorous or phosphorous acid compound. This compares with VCS colors of from about 2 to 9 or more for products produced without the aid of the catalyst of the present invention. Furthermore, products made according to the present invention have been found, as previously stated, to resist discoloration or darkening for storage periods of six months or more. The VCS scale is the widely used Gardner Scale, Standards of 1933.

Proportions of the selected phosphorous or hypophosphorous acid compound used as catalyst may be varied from about 0.01% to about 5% by weight of the non-ionic surface active reactant. The preferred treatment range is between about 0.5% and about 1.0%. The temperature employed may vary from ambient to about 200° C., preferably 40° to 160° C., optimally 80° to 120° C.

In carrying out the phosphation reaction in accordance with this invention, the $P_2S_5$ is preferably added gradually, with vigorous agitation, to the nonionic surface active agent in liquid form. If the latter agent is a solid at room temperature, it should be heated to above its melting point. Addition of the nonionic surface active agent to the $P_2S_5$ is inadvisable since this has been found to result in the formation of tar and the like and to prevent the reaction from proceeding to completion. The reaction is exothermic and in some cases cooling is necessary to prevent the temperature from going above about 160° C. since this tends to produce discolored and darkened products. The reaction proceeds continuously during addition of the $P_2S_5$ and solution thereof in the nonionic surface active agent, and is substantially 90% complete or more by the time all of the $P_2S_5$ has been added. The few particles of solid $P_2S_5$ remaining in the reaction medium may be removed at this point if time is of the essence, but it is preferred in the interests of economy to allow the reaction to proceed for an additional period of time which may range from ¼ to 5 hours or more at ambient temperatures up to about 200° C. until all of the $P_2S_5$ has dissolved indicating complete reaction between the reactants involved. Vigorous agitation during the reaction is highly desirable to facilitate and expedite completion of the reaction.

It is an advantageous feature of this invention that the $P_2S_5$ may be employed in dry, solid form as a granular powder or other finely divided or particulate form, for reaction with the above defined nonionic surface active agents. However, if desired, the $P_2S_5$ may first be dispersed in an inert organic diluent such as benzene, xylene, ether, pentane, or low and high boiling hydrocarbon fractions.

In accordance with this invention, the hypophosphorous or phosphorous acid compound is preferably admixed with the nonionic surface active agent prior to addition thereto of the $P_2S_5$. If desired, however, such compound may be added simultaneously with the addition of the $P_2S_5$ or, if anhydrous, may be admixed with the $P_2S_5$ prior to its addition to the nonionic surface active agent. It will accordingly be understood that the hypophosphorous or phosphorous acid compound or mixture thereof may be added at the start of the reaction or continuously or intermittently as the reaction proceeds.

Temperature control should be maintained, e.g., by water bath, since the reaction is exothermic. The temperature should not be allowed to rise excessively or too quickly. The reaction essentially ceases by the time all the phosphosulfide has been added.

After the reaction is completed, the reaction mixture may be cooled and discharged. A representatvie sample may then be taken and analyzed for phosphorous and sulfur content. Both phosphorous and sulfur may be determined by conventional analytical methods well known in the art, and hence they need not be described.

The products of this invention so far as described may be used in their free acid form, as recovered from the reactor, or alternatively, they may be used in the form of partially or completely neutralized salt which may contain alkali metals, alkaline earth metals, other metals or organic bases such as those of ammonia, amines and the like. For many purposes, the surfactant materials are preferred by ultimate users to be in the form of salts and sometimes the use of such salts is necessary. For example, when they are to be employed in mixtures or formulations which initially are alkaline or basic in nature, it is ordinarily essential that the salt be partly, or preferably completely, neutralized; in this form the salts are regarded as being essentially equivalent to the products in their free acid forms. As examples of suitable cations for the formation of salts, there may be mentioned sodium, potassium, lithium, calcium, strontium.

In each of the examples of thiophosphate ester which is produced, the non-ionic surfactant is first charged to a reactor equipped with an agitator. The materials when used in the liquid state are charged at room temperature. Products which are in the solid state at room temperatures are first melted and then charged to the reaction vessel at a temperature high enough to keep them molten, as previously indicated.

During the reaction the temperature is maintained within a suitable range, as noted. In some cases allowable temperatures may range from room temperature to as much as about 200° C. but preferably a temperature of about 80° C. to about 160° C. is maintained, as previously stated. When the reaction is carried out in the presence of water, the water should be added prior to the addition of the $P_2S_5$ containing compound. It may also be added concurrent with the addition of the catalytic amount of acid, when said acid is so employed.

The examples in the following table are only illustrative of the present invention and are not to be regarded as limitative. In each of these examples, the non-ionic surface active agent is first charged to a reactor equipped with an agitator. If the charge is solid at room temperature, it is heated to melt the same. The additive referred to in the table is then added to and dissolved in the non-ionic surface active agent with vigorous agitation. The solid granular $P_2S_5$ is then charged to the reactor with vigorous agitation over a period ranging from about 5 minutes to about 1 hour and usually about 15 minutes. After the initial exothermic reaction subsides, the reaction mixture is heated to 100° C. and held at this temperature for about 5 hours after which the mixture is cooled and discharged. A sample of the reaction mixture is titrated with alkali to methyl orange and then to phenolphthalein as a control on the esterification. The VCS color readings are measured in the prescribed manner.

In the following tables and in the appended claims all parts or proportions are by weight unless otherwise indicated:

TABLE I

| Example | Nonionic agent | Nonionic, parts | $P_2S_5$, parts | Parts | Additive | VCS color |
|---|---|---|---|---|---|---|
| 1 | Nonylphenol plus 2 E.O. ... $C_9H_{19}C_6H_4(OC_2H_4)_2OH$ | 2,288 | 284 | | Control | 2 |
| 2 | do | 2,288 | 284 | 3.4 | Hypophosphorous acid (50%) | 1 |
| 3 | Nonylphenol plus 4 E.O. ... $C_9H_{19}C_6H_4(OC_2H_4)_4OH$ | 2,355 | 213 | | Control | 4 |
| 4 | do | 2,355 | 123 | 4.2 | Hypophosphorous acid (50%) | 1 |
| 5 | Nonylphenol plus 6 E.O. ... $C_9H_{19}C_6H_4(OC_2H_4)_6OH$ | 484 | 47.3 | | Control | 4 |
| 6 | do | 484 | 47.3 | 1.0 | Hypophosphorous acid (50%) | 1 |
| 7 | do | 484 | 47.3 | 0.5 | Sodium hypophosphite | 1 |
| 8 | do | 484 | 47.3 | 2.0 | Triphenyl phosphite | 2 |
| 9 | Nonylphenol plus 10 E.O. ... $C_9H_{19}C_6H_4(OC_2H_4)_{10}OH$ | 1,821 | 108 | | Control | 4 |
| 10 | do | 1,821 | 108 | 7.0 | Hypophosphorous acid (30%) | 1 |
| 11 | Nonylphenol plus 100 E.O. ... $C_9H_{19}C_6H_4(OC_2H_4)_{100}OH$ | 605 | 11.9 | | Control | 2 |
| 12 | do | 605 | 11.9 | 1.2 | Hypophosphorous acid (50%) | 1 |
| 13 | Dinonylphenol plus 7 E.O. ... $C_{18}H_{38}C_6H_3(OC_2H_4)_7OH$ | 327 | 23.6 | | Control | 5 |
| 14 | do | 327 | 23.6 | 1.0 | Hypophosphorous acid (30%) | 1 |
| 15 | Dodecylphenol plus 6 E.O. ... $C_{12}H_{25}C_6H_4(OC_2H_4)_6OH$ | 1,052 | 94.4 | | Control | 4 |
| 16 | do | 1,052 | 94.4 | 3.0 | Hypophosphorous acid (50%) | 1 |
| 17 | Oxo tridecyl alcohol [1] plus 3 E.O. ... $C_{13}H_{27}(OC_2H_4)_3OH$ | 166 | 23.7 | | Control | 7 |
| 18 | do | 166 | 23.7 | 1.0 | Hypophosphorous acid (50%) | 2 |
| 19 | do | 166 | 23.7 | 1.0 | Phosphorous acid | 2 |
| 20 | Lauryl alcohol plus 4 E.O. ... $C_{12}H_{25}(OC_2H_4)_4OH$ | 724 | 71 | | Control | 7 |
| 21 | do | 724 | 71 | 1.3 | Hypophosphorous acid (50%) | 1 |

[1] From tetrapropylene by the Oxo process.

Table II indicates a number of products which are treated with various molar proportions of $P_2S_5$ ranging from one to as much as 4, in the presence of the catalyst. The resulting products were thereafter analyzed for phosphorous and sulfur content. The procedure described above was followed in each instance.

TABLE II

| Ex. No. | Nonionic surface active agent | | Molar ratio surfactant, $P_2S_5$ | Percent Phosphorous | Percent Sulfur |
|---|---|---|---|---|---|
| | Chemical name | Formula | | | |
| 1 | Phenol plus 2 BuO | $C_6H_5(OC_4H_8)_2OH$ | 1  1 | 14.5 | 29.9 |
| 2 | Octylphenol plus 9 E.O. | $C_8H_{17}C_6H_4(OC_2H_4)_9OH$ | 1  2 | 12.6 | 26.1 |
| 3 | Nonylphenol plus 1 E.O. | $C_9H_{19}C_6H_4(OC_2H_4)_1OH$ | 1  1 | 13.7 | 28.2 |
| 4 | Nonylphenol plus 4 E.O. | $C_9H_{19}C_6H_4(OC_2H_4)_4OH$ | 1  1 | 10.6 | 21.8 |
| 5 | Nonylphenol plus 6 E.O. | $C_9H_{19}C_6H_4(OC_2H_4)_6OH$ | 1  2 | 14.4 | 29.6 |
| 6 | Nonylphenol plus 9 E.O. | $C_9H_{19}C_6H_4(OC_2H_4)_9OH$ | 1  2 | 12.7 | 26.2 |
| 7 | Nonylphenol plus 15 E.O. | $C_9H_{19}C_6H_4(OC_2H_4)_{15}OH$ | 1  1 | 5.8 | 11.9 |
| 8 | Nonylphenol plus 30 E.O. | $C_9H_{19}C_6H_4(OC_2H_4)_{30}OH$ | 1  3 | 8.8 | 18.2 |
| 9 | Nonylphenol plus 50 E.O. | $C_9H_{19}C_6H_4(OC_2H_4)_{50}OH$ | 1  3 | 6.2 | 12.8 |
| 10 | Nonylphenol plus 100 E.O. | $C_9H_{19}C_6H_4(OC_2H_4)_{100}OH$ | 1  2 | 2.5 | 5.1 |
| 11 | Nonylphenol plus 150 E.O. | $C_9H_{19}C_6H_4(OC_2H_4)_{150}OH$ | 1  2 | 1.7 | 3.6 |
| 12 | Nonylcresol plus 10 E.O. | $C_9H_{19}(CH_3)C_6H_3(OC_2H_4)_{10}OH$ | 1  2 | 11.8 | 24.3 |
| 13 | Diamylphenol plus 8 E.O. | $(C_5H_{11})_2C_6H_3(OC_2H_4)_8OH$ | 1  1 | 6.4 | 13.3 |
| 14 | Dinonylphenol plus 7 E.O. | $(C_9H_{19})_2C_6H_3(OC_2H_4)_7OH$ | 1  1 | 6.0 | 12.4 |
| 15 | Didodecylphenol plus 18 E.O. | $(C_{12}H_{25})_2C_6H_3(OC_2H_4)_{18}OH$ | 1  4 | 12.5 | 25.8 |
| 16 | Tridodecylphenol plus 10 E.O. | $(C_{12}H_{25})_3C_6H_2(OC_2H_4)_{10}OH$ | 1  3 | 11.6 | 23.9 |
| 17 | Dioctadecylphenol plus 20 E.O. | $(C_{18}H_{37})_2C_6H_3(OC_2H_4)_{20}OH$ | 1  4 | 11.1 | 22.9 |
| 18 | Hexylalcohol plus 2 PrO | $C_6H_{13}(OC_3H_6)_2OH$ | 1  1 | 15.6 | 32.2 |
| 19 | Laurylalcohol plus 4 E.O. | $C_{12}H_{25}(OC_2H_4)_4OH$ | 1  1 | 11.4 | 23.6 |
| 20 | Tridecylalcohol plus 10 E.O. | $C_{13}H_{27}(OC_2H_4)_{10}OH$ | 1  2 | 12.2 | 25.1 |
| 21 | Stearyl alcohol plus 20 E.O. | $C_{18}H_{37}(OC_2H_4)_{20}OH$ | 1  3 | 10.8 | 22.3 |
| 22 | Docosanol plus 30 E.O. | $C_{22}H_{45}(OC_2H_4)_{30}OH$ | 1  2 | 6.1 | 12.6 |
| 23 | Dodecylmercaptan plus 6 E.O. | $C_{12}H_{25}SC_2H_4(OC_2H_4)_6OH$ | 1  2 | 14.7 | 30.3 |
| 24 | Lauric acid plus 5 E.O. | $CH_3(CH_2)_{10}CO(OC_2H_4)_5OH$ | 1  1 | 10.3 | 21.3 |
| 25 | "Pluronic L-62" | $HO(C_2H_4O)_5(C_3H_6O)_{30}(C_2H_4O)_5H$ | 1  4 | 8.4 | 17.3 |
| 26 | Cresol plus 150 E.O. | $C_6H_4(CH_3)(OC_2H_4)_{150}OH$ | 1  2 | 1.7 | 3.6 |
| 27 | Cresol plus 60 PrO | $C_6H_4(CH_3)(OC_3H_6)_{60}OH$ | 1  4 | 5.7 | 11.8 |
| 28 | Nonylphenol plus 30 BuO | $C_9H_{19}C_6H_4(OC_4H_8)_{30}OH$ | 1  4 | 7.9 | 16.3 |
| 29 | Dodecylcresol plus 50 BuO | $C_{12}H_{25}(CH_3)C_6H_3(OC_4H_8)_{50}OH$ | 1  3 | 4.2 | 8.6 |
| 30 | Nonylphenol plus 10 PrO | $C_9H_{19}C_6H_4(OC_3H_6)_{10}OH$ | 1  2 | 10.5 | 21.7 |
| 31 | Dinonylphenol plus 40 PrO | $(C_9H_{19})_2C_6H_3(OC_3H_6)_{40}OH$ | 1  2 | 4.1 | 8.4 |
| 32 | Dodecylphenol plus 2 PrO | $C_{12}H_{25}C_6H_4(OC_3H_6)OH$ | 1  1 | 10.9 | 22.5 |
| 33 | Tridecylphenol plus 40 BuO | $C_{13}H_{27}(OC_4H_8)_{40}OH$ | 1  4 | 6.5 | 13.3 |
| 34 | Stearylalcohol plus 90 PrO | $C_{18}H_{37}(OC_3H_6)_{90}OH$ | 1  2 | 2.1 | 4.4 |
| 35 | Laurylalcohol plus 60 BuO | $C_{12}H_{25}(OC_4H_8)_{60}OH$ | 1  4 | 4.7 | 9.7 |
| 36 | Nonlyphenol | $C_9H_{19}C_6H_4OH$ | 2  1 | 9.8 | 20.4 |
| 37 | Dioctadecylphenol | $(C_{18}H_{37})_2C_6H_3OH$ | 1  2 | 12.7 | 26.2 |
| 38 | Butylphenol | $C_4H_9C_6H_4OH$ | 4  1 | 7.9 | 16.2 |

Table III shows the color companion of selected compounds taken from Tables I and II.

TABLE III

| Nonionic surface active agent | Reaction product of— Moles with $P_2S_5$ moles | | Normal VCS color | New VCS color |
|---|---|---|---|---|
| Phenol plus 2 BuO | 4 | 1 | 7 | 3 |
| Nonylphenol | 2 | 1 | 4 | 2 |
| Nonylphenol plus 100 E.O. | 1 | 2 | 9 | 4 |
| Dioctadecylphenol plus 20 E.O. | 1 | 4 | 3 | 2 |
| Lauryl alcohol plus 4 E.O. | 1 | 1 | 3 | 1 |
| Dodecyl mercaptan plus 6 E.O. | 1 | 2 | 5 | 3 |
| Pluronic L-62 | 1 | 4 | 8 | 4 |
| Dodecylcresol plus 50 BuO | 1 | 3 | 4 | 2 |
| Dinonylphenol plus 40 PrO | 1 | 2 | 6 | 3 |
| Stearylalcohol plus 90 PrO | 1 | 2 | 9 | 4 |
| Cresol plus 150 E.O. | 4 | 1 | 4 | 1 |
| Dodecylphenol plus 2 PrO | 3 | 1 | 7 | 2 |

It will be noted that in each case there is a substantial reduction in the VCS color, as compared with the normal prior art material. The products of this invention have good surface active, foaming, emulsifying, disbursing, suspending, wetting, lubricating, detergent corrosion inhibiting and like properties. All of such properties depend in a large measure upon the original base material which is treated, since they are generally similar to the particular non-ionic surfactant or other base employed as starting materials. Products having widely divergent ranges of properties may be obtained by mixing the thiophosphate esters so obtained. For example, dithiophosphate esters may be mixed with monothiophosphate esters which contain different non-ionic residues, etc. In some cases these mixed compositions have certain advantages as compared with corresponding sulfate esters. In particular, they frequently have lower acidity, more soap-like properties and other desirable physical properties not possessed by the starting material. They also frequently have other technical advantages as compared with the usual additives employed in wetting, foaming, emulsifying, detergent, suspending and dispersing compositions and the like. The products of this invention generally range in appearance from waxy solids to viscous liquids. Their state depends mainly upon the type of base employed as the initial reactant material.

It will be obvious from the discussion above that the products of these reactions may be formulated as commercial detergents, emulsifiers, etc., with the addition of usual modifiers. Thus, the usual alkaline substances and adjunctive materials such as builders, soaps, suspending agents, brighteners, stabilizers, corrosion inhibitors, solvents and the like may be employed, depending upon the particular use contemplated.

Materials of the present invention may also be used in the formulation of various surface active products or products where a surface active component is needed, including those for non-aqueous applications. They are useful, for example, particularly in the field of petroleum additives. They may be used as detergents or dispersants, etc., in gasoline or in other fuels and they are useful in motor oils for detergency, sludge suspension, metal deactivation, etc. They may also be used in other lubricant compositions and in many products for related, or in some cases, unrelated purposes.

It will be understood by those skilled in the art that various modifications may be made without departing from the spirit and purpose of the invention.

What we claim as new and novel and desired to be secured by Letters Patent, is as follows:

1. A process for making phosphosulfurized compositions comprising heating (1) about 1 to about 5 moles of a nonionic surface-active agent having the molecular configuration of a condensation product of at least 1 mole of an alkylene oxide of from 2 to 4 carbon atoms with 1 mole of an organic compound containing about 5 to about 40 carbon atoms and a reactive hydrogen atom selected from the group consisting of alcohols, phenols, thiols, alkylphenols, fatty acids, amides, and imides, and sulfonic acids, amides and imides with (2) a compound containing the equivalent of about 0.25 to about 4.0 moles of $P_2S_5$ in the presence of 0 to about 5% of water based on the weight of unit (1) and a catalytic amount of (3) phosphorous acid, hypophosphorous acid, neutral esters or salts thereof at a temperature below 200° C. for about a ¼ to about 5 hours.

2. A phosphosulfurized composition produced in accordance with the process of claim 1.

3. A composition as defined in claim 1 containing approximately by weight at least 2% phosphorous and 4% sulfur.

4. A composition as defined in claim 1 wherein the molar ratio of (2) to (1) is at least 1:1.

5. A process as defined in claim 1 wherein the temperature is about 40° C. to about 160° C.

6. A process as defined in claim 1 wherein unit (3) is employed in amounts ranging from about 0.01 to about 5.0% by weight based on the weight of said nonionic surface-active agent.

7. A process as defined in claim 1 wherein unit (3) and any such water are added to unit (1) prior to the addition of unit (2).

8. A process as defined in claim 1 wherein unit (3) is added to unit (1) concurrent with the addition of unit (2).

9. A process as defined in claim 1 wherein said compound (2) is selected from the group consisting of $P_2S_5$, $P_4S_3$, $P_4S_7$ and $P_4S_{10}$.

References Cited

UNITED STATES PATENTS

| | | | |
|---|---|---|---|
| 3,337,654 | 8/1967 | Cyba | 260—981 X |
| 2,701,258 | 1/1955 | Brown et al. | 260—980 |
| 2,506,310 | 5/1950 | Mikeska | 260—981 X |

ANTON H. SUTTO, Primary Examiner

U.S. Cl. X.R.

252—Dig. 17; 260—98, 402.5, 929, 944, 947, 948, 950, 951, 981